United States Patent [19]
Gonidec et al.

[11] Patent Number: 6,026,638
[45] Date of Patent: Feb. 22, 2000

[54] THRUST REVERSER DOOR WITH ISOLATED OUTER PANEL

[75] Inventors: Patrick Gonidec, Montivilliers; Gerard Pascal Rouyer, Saint Aubin Routot; Bernard Guy Vauchel, Le Havre, all of France

[73] Assignee: Societe Hispano-Suiza Aerostructures, France

[21] Appl. No.: 09/041,636

[22] Filed: Mar. 13, 1998

[30] Foreign Application Priority Data

Mar. 13, 1997 [FR] France ................................ 97 02983

[51] Int. Cl.[7] .................................................. F02K 3/02
[52] U.S. Cl. ...................... 60/226.2; 60/230; 244/110 B; 239/265.27
[58] Field of Search .................... 60/226.2, 230; 244/110 B; 239/265.27, 265.29, 265.19

[56] References Cited

U.S. PATENT DOCUMENTS

| | | | |
|---|---|---|---|
| 3,279,182 | 10/1966 | Helmintoller | 60/226 |
| 3,280,562 | 10/1966 | Theits | 60/229 |
| 3,603,090 | 2/1971 | Billinger | 60/226.2 |
| 3,605,411 | 9/1971 | Maison et al. | 60/226 |
| 3,699,682 | 10/1972 | Kleckner | 60/226.2 |
| 3,739,582 | 6/1973 | Maison | 60/226.2 |
| 5,003,770 | 4/1991 | Schegrin et al. | 60/226.2 |
| 5,039,171 | 8/1991 | Lore | 60/230 |
| 5,040,730 | 8/1991 | Hogie et al. | 60/230 |
| 5,054,285 | 10/1991 | Geidel | 60/226.2 |
| 5,211,008 | 5/1993 | Fage | 60/226.2 |
| 5,224,342 | 7/1993 | Lair | 60/230 |
| 5,243,817 | 9/1993 | Matthias | 60/226.2 |
| 5,284,015 | 2/1994 | Carimali et al. | 239/265.29 |
| 5,671,598 | 9/1997 | Standish | 60/226.2 |

FOREIGN PATENT DOCUMENTS

| | | |
|---|---|---|
| 1 482 538 | 5/1967 | France . |
| 2 030 034 | 10/1970 | France . |

*Primary Examiner*—Ted Kim
*Attorney, Agent, or Firm*—Bacon & Thomas PLLC

[57] ABSTRACT

A thrust reverser is disclosed for an aircraft jet engine having a bypass duct enclosing a cowling with an outer cowling surface and a reverse thrust opening extending through the cowling. The thrust reverser has a thrust reverser door in the opening movable between a forward thrust position, in which the thrust reverser door covers the reverse thrust opening, and a reverse thrust position in which the thrust reverser door is moved within the thrust reverser opening, which is then uncovered, into a gas deflecting position at which position a portion of the door extends into the bypass duct. The thrust reverser door has an inner panel defining a part of the gas duct and an outer panel having an outer surface substantially flush with the outer cowling surface when the thrust reverser door is in the forward thrust position. The inner panel is sealed against the cowling. One or more discrete, narrow structural isolating connectors connect the outer panel to the inner panel in a manner that isolates the outer panel from radial deflections of the inner panel relative to the connectors that may result from gas pressure differential across the inner panel. Latches for securing the thrust reverser doors are aligned with the isolating connector(s) longitudinally.

8 Claims, 5 Drawing Sheets

THRUST REVERSER DOOR WITH ISOLATED OUTER PANEL

BACKGROUND OF THE INVENTION

1. Field of the Invention

The present invention relates to a thrust reverser door for a bypass type turbojet engine.

2. Related Art

Turbofan-type turbojet engines are well known in the art and typically comprise a fan at the front of the turbojet engine which directs a flow of bypass air through a gas duct bounded by the engine cowling on the inside and a fan cowling on the outside. The generally annular duct bounded by the engine cowling and the fan cowling may channel both the bypass flow and the primary exhaust gas flow downstream from the turbojet engine, or may channel only the bypass flow.

In aircraft on which the turbojet engine is mounted outside of the airframe structure, the fan cowling and the engine cowling are configured to form respectively outer and inner boundaries of the annular bypass gas flow duct and to provide aerodynamic outer surfaces to reduce drag.

FIGS. 1 and 2 illustrate a known pivoting door-type thrust reverser 2 associated with the cowling 1 of a turbofan-type turbojet engine. As illustrated in FIG. 1, the upstream portion of the cowling which defines the outer limits of a bypass flow duct 15 and which is generally concentrically arranged about the turbojet engine (not shown) generally comprises an external cowling panel and an internal cowling panel interconnected by a frame elements 6. The outer surface of the external cowling panel has an aerodynamic configuration over which the air external to the engine passes during aircraft flight. The inner surface of the inner cowling panel defines the outer boundary of the bypass flow duct 15 through which the bypass flow air passes from left to right as viewed in FIG. 1.

The cowling also comprises a thrust reverser, illustrated generally at 2, located in a reverse thrust opening between the upstream cowling portion and a downstream cowling portion 3. The thrust reverser 2 comprises a door 7 pivotally attached to the cowling so as to pivot in the opening about transverse axis 17 such that it is movable between a closed, forward thrust position, illustrated in FIG. 1, and an open, reverse thrust position in which the forward end (towards the left as viewed in FIG. 1) of the thrust reverser door 7 is moved outwardly from the cowling, while a rear portion is moved inwardly into the bypass flow duct airstream so as to redirect or deflect at least a portion of the bypass flow through the reverse thrust opening in the cowling in a direction that has a reverse thrust component.

An actuator 8 for moving the door 7 between its forward thrust and reverse thrust positions may comprise a cylinder extending through and mounted to the frame 6, and having an extendable and retractable piston rod connected to the thrust reverser door 7.

The thrust reverser door 7 has an outer door panel 9 and an inner door panel 11 joined together by structural elements 9' to form an integrated structural door 7. The forward end of the door 7 may have a deflector to maximize the efficiency of the thrust reverser when the door 7 is in the reverse thrust position. When the door is in the forward thrust position, as illustrated in FIG. 1, the outer door panel 9 is substantially flush with the external surfaces of the upstream panel and the downstream cowling portion 3. The inner door panel 11 tapers toward the outer door panel 9 at the forward end of the door 7, forming a cavity C when in the forward thrust position.

As illustrated in FIG. 2, a plurality of thrust reverser doors 7 may be incorporated into the cowling, such doors being circumferentially spaced around the periphery of the cowling. Longitudinal beam portions 18 extend axially between forward part 4 and rear part 3 of the cowling between adjacent thrust reverser doors 7 to provide structural rigidity to the cowling and to provide pivot mounting points for attaching the doors 7 to the cowling. U.S. Pat. No. 3,605,411, and French Patents 1,482,538 and 2,030,034 illustrate typical, known thrust reversers.

It is known to utilize one linear actuator per thrust reverser door affixed to the cowling and the thrust reverser door to move the door between the forward and reverse thrust positions, as illustrated in the aforementioned French Patent 1,482,538.

In all of the above mentioned thrust reversers, the thrust reverser doors comprise structurally integrated assemblies with the outer panel forming the external surface of the thrust reverser door (when in the forward thrust position) structurally joined as a unit to an inner panel. Seals 5 are typically located at the juncture of the door and the cowling. While generally satisfactory, such structurally integrated thrust reverser doors may create problems during aircraft flight since the pressure within the gas flow duct 15 is higher than the ambient air pressure surrounding the cowling. As a result of this pressure differential, the thrust reverser door is stressed and may undergo geometric deformations. Such deformations may cause gaps between the exterior surface of the integral thrust reverser door and the cowling edges defining the reverse thrust opening that seriously degrade aerodynamic performance of the cowling.

SUMMARY OF THE INVENTION

A thrust reverser is disclosed for an aircraft jet engine having a cowling with an outer cowling surface and a reverse thrust opening extending through the cowling. The thrust reverser has a thrust reverser door movable in the opening between a forward thrust position, in which the thrust reverser door covers the reverse thrust opening, and a reverse thrust position in which the thrust reverser door is displaced from the thrust reverse opening which is then uncovered. When so displaced, a part of the door is moved into a gas flow duct in a gas deflecting position to redirect the thrust of gas flowing in the duct. The thrust reverser door has an inner panel forming part of the outer wall of the gas flow duct, an outer panel having an outer surface substantially flush with the outer cowling surface when the thrust reverser door is in the forward thrust position, and one or more structural isolating connectors connecting the outer panel to the inner panel in a manner so as to isolate the outer panel from radial deflections of the inner panel relative to the connector. The lateral transverse width of each structural isolating connector is substantially less than the lateral transverse width of the outer and inner panels so that the connector permits radial deformation of the inner panel due relative to the isolating connector due to the pressure differential between the duct and the ambient atmospheric pressure, while also isolating the outer panel from such deformation so the outer surface of the outer panel remains substantially flush with the outer cowling surface when the thrust reverser door is in the forward thrust position and the gap between the outer panel and adjacent cowling remains substantially unchanged.

The structural isolating connector may comprise a single discrete relative narrow structural connector centrally located between the opposed inner and outer panels of the thrust reverser door, with the isolating connector extending along substantially the entire axial length of the thrust reverser door, or the isolating connector may extend only partially along the axial length of the thrust reverser door. Alternatively, the discrete structural isolating connector may be displaced from the center longitudinal axis of the thrust reverser door, or a plurality of discrete structural isolating connectors may be utilized to connect the inner panel and the outer panel in a manner so as to isolate the outer panel from radial deflections of the inner panel relative to the connector.

The present invention also involves locating the latch to lock the thrust reverser door in a forward thrust position so that the latch is longitudinally aligned with a or each structural isolating connector between the inner and outer panels.

A seal is interposed between the inner panel and the cowling to prevent the gases within the gas flow duct, which have a higher pressure than the ambient atmosphere surrounding the outer portion of the cowling, from leaking around the inner panel. Since the outer panel is not subjected to the deflection of the inner panel caused by the pressure differential, the flushness between the outer panel surface and the outer cowling surface may be maintained throughout the operating modes of the aircraft, thereby avoiding aerodynamic problems that could be encountered with prior art devices.

DETAILED DESCRIPTION OF THE PREFERRED EMBODIMENTS

Figure 1:
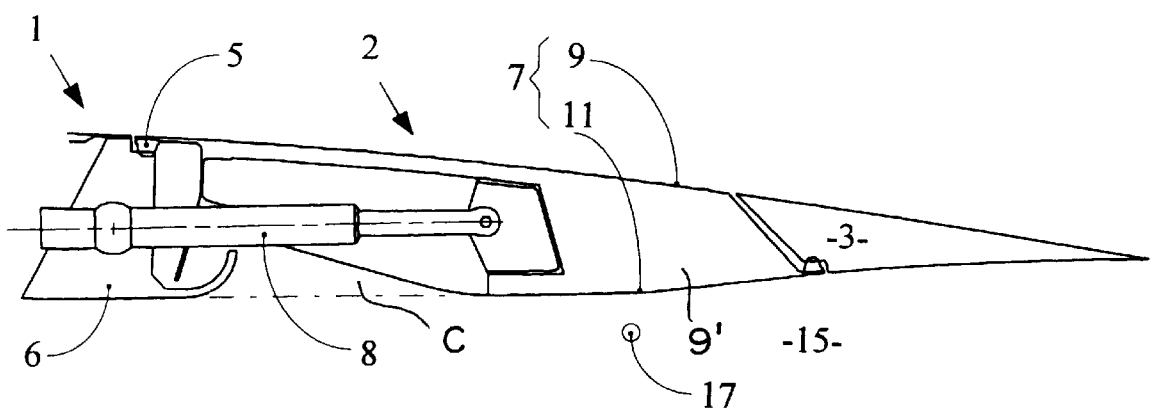
FIG. 1 is a partial, longitudinal, cross-sectional view of a known type of thrust reverser with the thrust reverser door in the forward thrust position.
Figure 2:
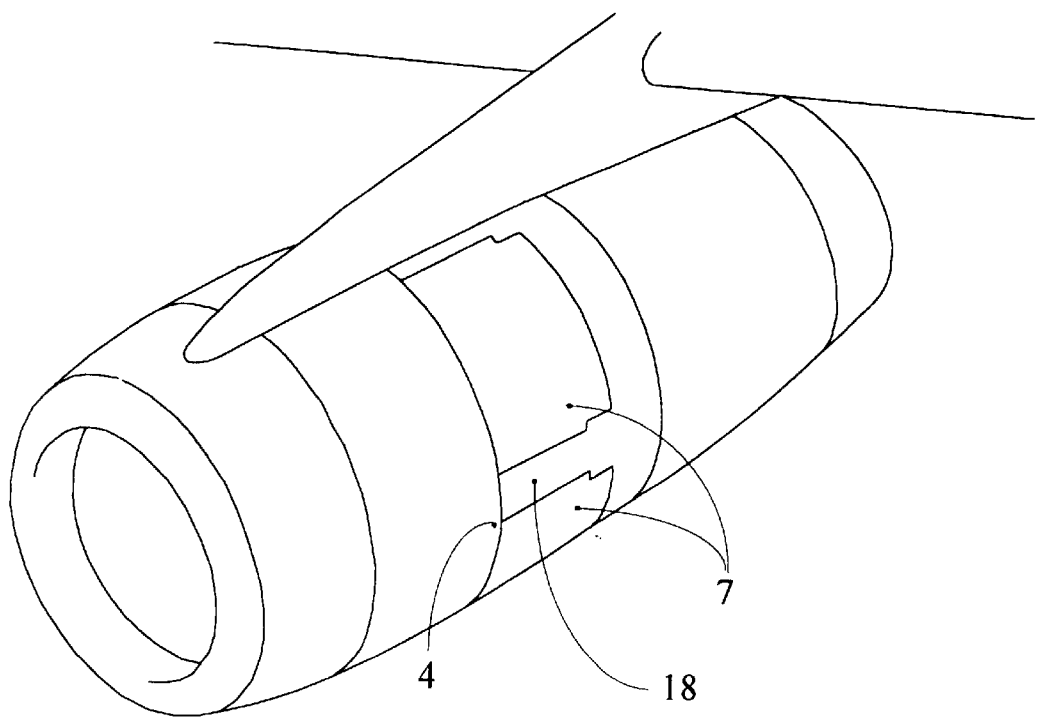
FIG. 2 is a perspective view of a jet engine cowling incorporating the thrust reverser doors illustrated in FIG. 1.
Figure 3:
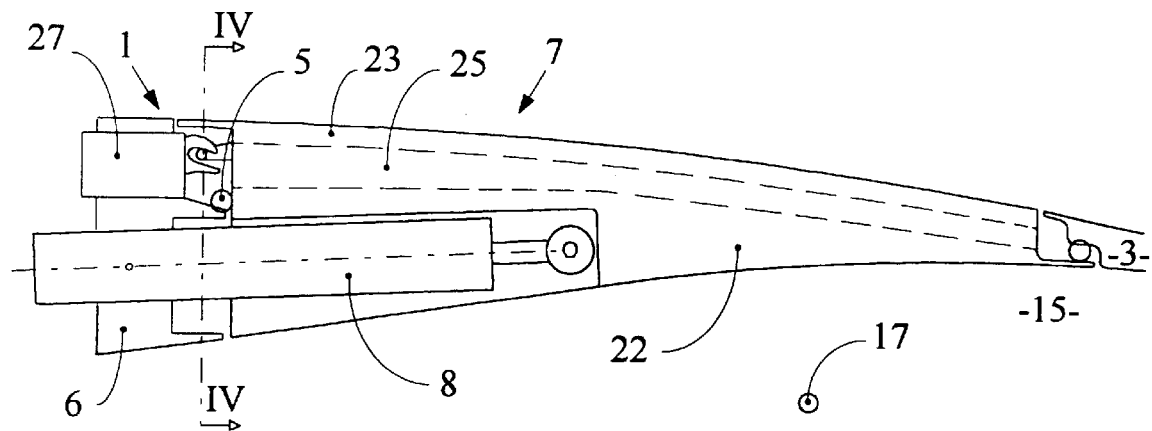
FIG. 3 is a partial, longitudinal, cross-sectional view of a first embodiment of the thrust reverser door according to the present invention, with the thrust reverser door in the forward thrust position.
Figure 4:
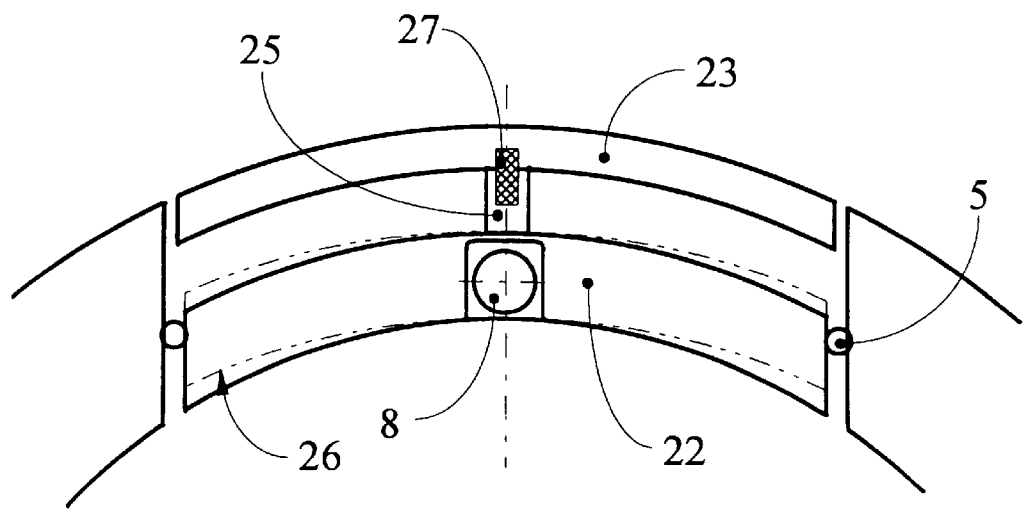
FIG. 4 is a cross-sectional view taken along line IV—IV in FIG. 3.

FIGS. 3 and 4 illustrate a first embodiment of a thrust reverser door according to the present invention. As in the prior art devices, the thrust reverser door 7 is pivotally attached to a cowling 1 so as to pivot in a reverse thrust opening in the cowling about transverse axis 17 upon actuation by linear actuator 8 extending between the thrust reverser door 7 and the front frame 6 of the cowling 1. An inner surface or panel of the cowling and inner panel 22 of the thrust reverser door form an outer boundary of a gas flow duct 15. The thrust reverser door 7 comprises the inner panel 22 and an outer panel 23 with a central longitudinal discrete structural isolating connector 25 serving as the sole connection between the outer panel 23 and the inner panel 22. When the thrust reverser door is in the forward thrust position, the outer surface of outer panel 23 is substantially flush with the outer of the cowling so as to preserve the aerodynamic contours of the outer cowling surface. When the door 7 is in the forward thrust position, seals 5 are interposed between the inner panel 22 and the adjacent cowling surfaces to prevent the pressurized gases within the gas flow duct 15 escaping out of the duct 15. The pressure of the gases within the gas flow duct 15 are greater than the ambient atmospheric pressure acting on the outer surface of the cowling, the outer panel 23 and an outer surface of the inner panel 22. This pressure differential may cause the inner panel 22 to slightly deform in a radial or circumferential direction relative to the isolating connector 25, as indicated by the dashed lines 26 in FIG. 4. Since the inner panel 22 is solely connected to the outer panel 23 by the structural isolating connector 25, this deformation is not transmitted to the outer panel 23. Thus, the outer panel 23 is isolated from the radial deflection of inner panel 22, thereby preserving the aerodynamic shape of the outer surface of the cowling assembly.

Latch 27 latches the forward edge (towards the left as viewed in FIG. 3) of the thrust reverser door 7 when the thrust reverser door is in the forward thrust position. The latch, in known fashion, has a movable latching element that engages with a portion of the thrust reverser door. As best illustrated in FIG. 4, the latch 27 is longitudinally aligned with the structural isolating connector 25 to hold the inner and outer panels in a closed position, and to prevent any movement of the structural isolating connector 25 and the outer panel 23 despite radial deformation of portions of the inner panel 22 on either side of the connector. Since the outer panel 23 is not connected to the inner panel 22 at any other area, inner panel 22 may undergo radial deformation without transferring this deformation relative to the connector 25 to the outer panel 23, which remains isolated from such deformations.

In this embodiment, a pair of discrete structural isolating connectors 25 is equidistantly spaced between the opposite lateral edges of the thrust reverser door 7 and they extend along substantially the entire axial length of the thrust reverser door. It is to be understood, however, that the discrete structural isolating connector 25 may be laterally offset from the longitudinal central axis of the thrust reverser door without departing from the scope of this invention.

Figure 5:
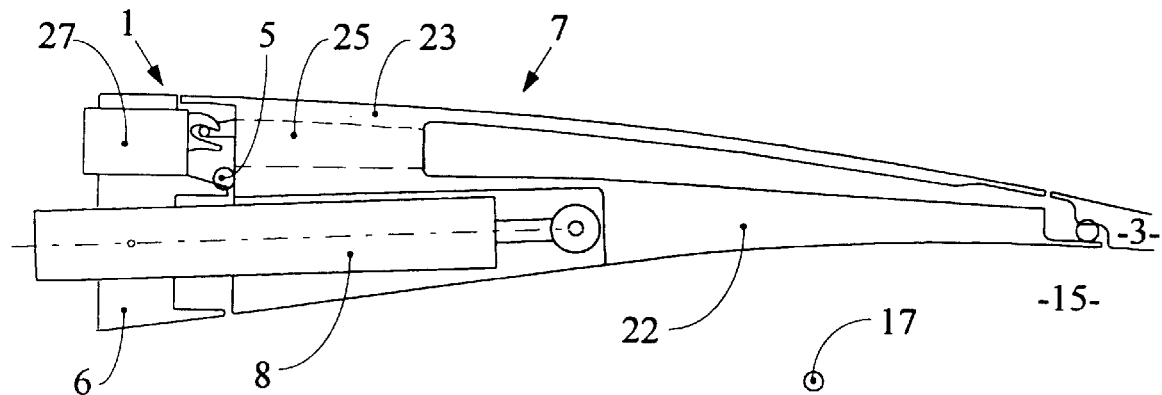
FIG. 5 is a view similar to FIG. 3 illustrating a second embodiment of the present invention.

In the modification illustrated in FIG. 5, the structural isolating connector 25 extends only along a portion of the axial length of the thrust reverser door 7. Again, this shortened discrete structural isolating connector may, as illustrated, be located at a forward portion of the thrust reverser door, or at any other longitudinal location depending upon the individual design parameters of each specific application. Also, the structural isolating connector 25 may be aligned with the central axis of the thrust reverser door, or may be laterally offset, as in the previously described embodiment.

Figure 7:
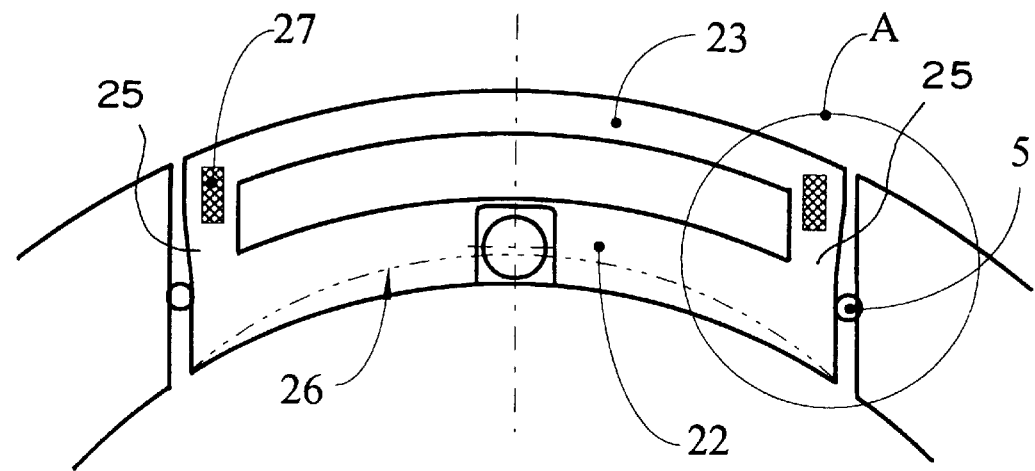
FIG. 7 is a cross-sectional view taken along line VII—VII in FIG. 6.
Figure 6:
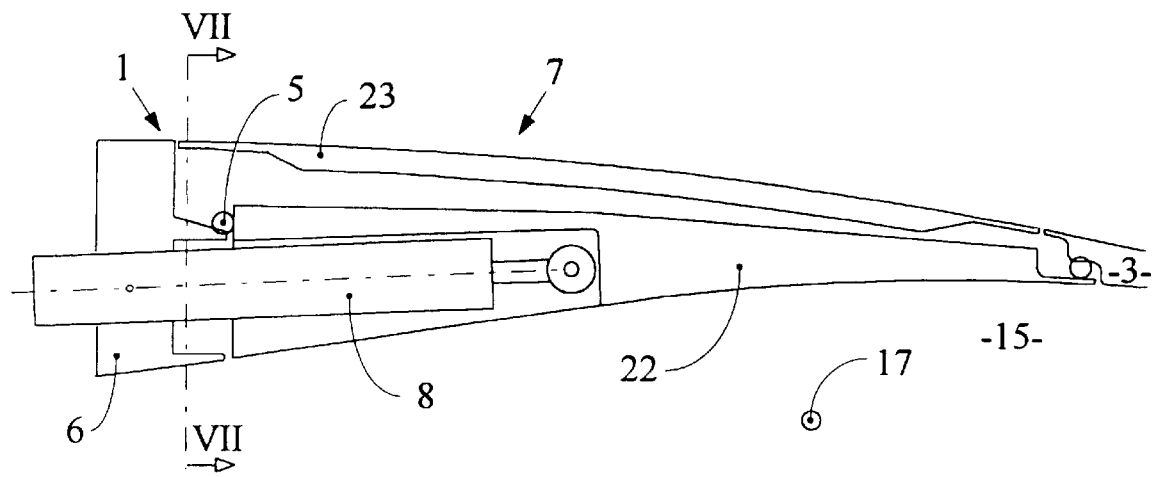
FIG. 6 is a view similar to FIG. 3 illustrating a third embodiment of a the present invention.
Figure 8:
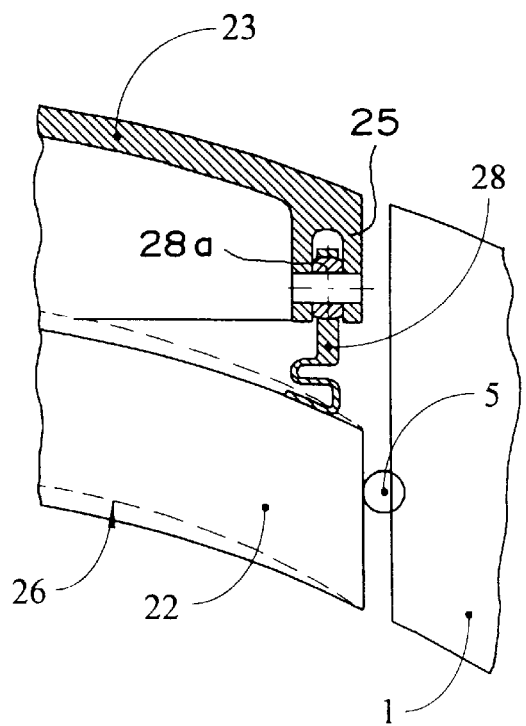
FIG. 8 is an enlarged, cross-sectional view of the area A in FIG. 7.

FIGS. 6–8 illustrate an alternative embodiment in which a plurality of discrete structural isolating connectors 25 are utilized. In this particular embodiment, the pair of discrete structural isolating connectors 25 are transversely offset and located adjacent to the opposite lateral sides of the outer panel and the inner panel and, again, serve as the sole connection between the outer panel 23 and the inner panel 22. Latches 27 are longitudinally aligned and connectable with each of the structural isolating connectors 25 to prevent any deformation of either the outer panel 23, or the inner panel 22 at the lateral side locations. Such restraint will cause the pressure differential to radially deform the inner structure 22 in a central area relative to the isolating connectors 25, as illustrated by dashed lines 26 in FIGS. 7 and 8. Since there is no motion transmitting connection between the central area of the inner panel 22 and the central area of the outer panel 23 in the deformation area, the deformation of panel 22 relative to the connectors 25 will not be transferred to the outer panel 23, which is thus isolated from such deformation. Seals 5 are interposed between the inner panel 22 and the adjacent cowling structure to prevent the pressurizes gases within the gas flow duct 15 from escaping around the inner panel. As best illustrated in FIG. 8, the structural isolating connector 25 may be structurally connected to the inner structure 22 by a movable, or resilient linkage portion 28. Movable linkage portion 28 also may be connected to the outer panel 23 by a known type of swivel 28a. This in effect isolates the outer panel 23 from any deflection 26 in the inner panel 22 relative to the connector 25 caused by gas pressure differential.

Figure 9:
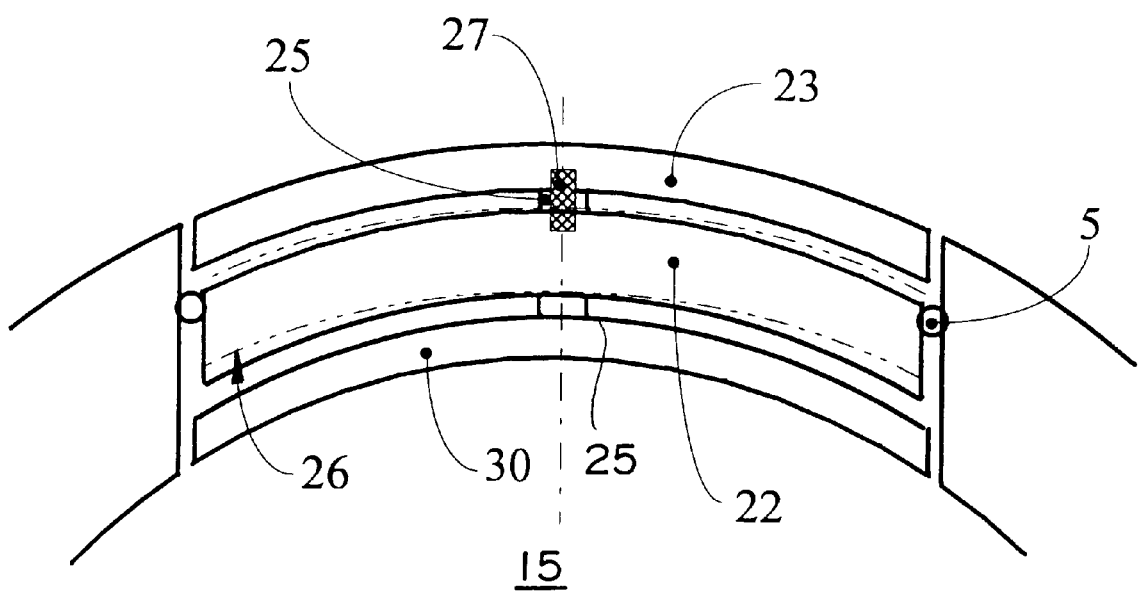
FIG. 9 is a partial, transverse cross-sectional view of an alternative embodiment of the thrust reverser door according to the present invention.

An alternative embodiment of the invention is illustrated in FIG. 9. This embodiment is similar to the embodiments illustrated in FIGS. 3–5, and further includes an inner shield panel 30 connected to the inner panel 22 by at least one second isolating structural connector 25. As can be seen, an inner surface of the shield panel 30 forms a portion of the outer boundary of the gas flow duct 15 and both opposite sides of the shield panel 30 are subjected to the pressure of the gas within the gas flow duct 15 because no seal is provided between the cowling and the shield panel. Since the shield panel 30 is not subjected to the aforementioned pressure differential, as is the inner panel 22 having a seal 5, the deformation of inner panel 22 relative to the isolating connector 25, as illustrated in dashed lines 26, is also isolated from the shield panel 30. Thus, the shield panel inner surface will continue to form a smooth outer boundary of the gas flow duct to thereby minimize gas flow disturbances as a gas is passed through the gas flow duct. Although a discrete, second structural isolating connector 25 is illustrated in FIG. 9 between shield panel 30 and inner panel 22, it is to be understood that a plurality of structural isolating connectors according to the previously described embodiments also may be utilized to connect the shield panel 30 to the inner panel 22.

In all of the foregoing descriptions, the latch 27 has been described as acting on the reverser door at either the structural isolating connector 25 or the outer panel 23. It is to be understood that latch 27 could also act on the door adjacent the inner panel 22 within the scope of this invention, provided the latch is aligned with the isolating connector(s).

The foregoing description is provided for illustrative purposes only and should not be construed as in any way limiting this invention, the scope of which is defined solely by the appended claims.

We claim:

1. A thrust reverser for an aircraft jet engine having an annular gas flow duct, a cowling having an outer cowling surface, at least one reverse thrust opening extending from the gas flow duct to the cowling outer surface; and at least one thrust reverser door located in said opening and movable between a forward thrust position in which the at least one thrust reverser door covers the at least one reverse thrust opening, and a reverse thrust position in which the at least one thrust reverser door is displaced within the at least one reverse thrust opening so that the at least one reverse thrust opening is uncovered with a portion of the door extending into the gas flow duct in a gas deflecting position, the at least one thrust reverser door comprising:

an inner panel defining a portion of the outer wall of said gas flow duct;
 an outer panel having an outer panel surface substantially flush with the outer cowling surface when the at least one thrust reverser door is in the forward thrust position;
 a seal interposed between the inner panel and adjacent cowling structure when the at least one thrust reverser door is in the forward thrust position;
 at least one discrete structural isolating connector connecting the outer panel and the inner panel forming said at least one thrust reverser door, said discrete structural isolating connector having a transverse width that is substantially less than a transverse width of the inner and outer panels, said isolating connector isolating the outer panel from radial deformation of the inner panel relative to the isolating connector due to differential gas pressure forces acting on the inner panel; and
 a latch securing the cowling to the at least one thrust reverser door when said door is in the forward thrust position, said latch located in longitudinal alignment with said at least one discrete structural isolating connector.

2. The thrust reverser as claimed in claim 1, wherein the at least one discrete structural isolating connector is located substantially equidistant from opposite lateral sides of the at least one thrust reverser door.

3. The thrust reverser as claimed in claim 1, wherein the at least one structural isolating connector is transversely offset with respect to a central longitudinal axis of the at least one thrust reverser door.

4. The thrust reverser as claimed in claim 1, wherein the at least one discrete structural isolating connector extends substantially along an entire axial length of the at least one thrust reverser door.

5. The thrust reverser as claimed in claim 1, wherein an axial length of the at least one discrete structural isolating connector is substantially less than an axial length of the at least one thrust reverser door.

6. The thrust reverser as claimed in claim 1, including a plurality of said discrete structural isolating connectors disposed between said inner and outer panels, said plurality of structural isolating connectors isolating the outer panel from radial deformation of the inner panel relative to the isolating connectors due to differential gas pressure forces acting on the inner panel;

latches securing the cowling to the at least one thrust reverser door when the at least one thrust reverser door is in the forward thrust position, each latch being located in longitudinal alignment with a respective one of the discrete structural isolating connectors.

7. The thrust reverser as claimed in claim 6, including swivel connectors connecting the structural isolating connectors to the inner panel.

8. The thrust reverser as claimed in claim 7, including flexible elements connecting the structural isolating connectors to the inner panel.

* * * * *

UNITED STATES PATENT AND TRADEMARK OFFICE
CERTIFICATE OF CORRECTION

PATENT NO. : 6,026,638
DATED : February 22, 2000
INVENTOR(S) : Patrick Gonidec et al.

It is certified that error appears in the above-identified patent and that said Letters Patent is hereby corrected as shown below:

Cover page, Item [75]; change "Bernard Guy Vauchel," to --Guy Bernard Vauchel,--

Column 2, line 56, delete "due".

Signed and Sealed this

Seventeenth Day of April, 2001

Attest:

NICHOLAS P. GODICI

Attesting Officer          Acting Director of the United States Patent and Trademark Office